(12) United States Patent  
Ching

(10) Patent No.: US 8,543,620 B2  
(45) Date of Patent: Sep. 24, 2013

(54) SYSTEM AND METHOD FOR INDEPENDENT VERIFICATION AND VALIDATION

(75) Inventor: Philip W. Ching, Gaithersburg, MD (US)

(73) Assignee: ApLix Research, Inc., Gaithersburg, MD (US)

( * ) Notice: Subject to any disclaimer, the term of this patent is extended or adjusted under 35 U.S.C. 154(b) by 140 days.

(21) Appl. No.: 13/111,088

(22) Filed: May 19, 2011

(65) Prior Publication Data

US 2011/0307454 A1 Dec. 15, 2011

Related U.S. Application Data

(60) Provisional application No. 61/353,843, filed on Jun. 11, 2010.

(51) Int. Cl.
*G06F 7/00* (2006.01)
*G06F 17/30* (2006.01)

(52) U.S. Cl.
USPC ............................ 707/803; 707/804; 707/805

(58) Field of Classification Search
USPC .......................... 707/802–805, 736, 600, 608
See application file for complete search history.

(56) References Cited

U.S. PATENT DOCUMENTS

| | | | | |
|---|---|---|---|---|
| 6,108,662 | A * | 8/2000 | Hoskins et al. | 707/758 |
| 6,560,620 | B1 | 5/2003 | Ching | |
| 6,978,420 | B2 | 12/2005 | Ching | |
| 7,113,923 | B1 | 9/2006 | Brichta et al. | |
| 7,596,416 | B1 | 9/2009 | Maluf et al. | |
| 2003/0163547 | A1 * | 8/2003 | Beisty et al. | 709/217 |
| 2005/0033669 | A1 * | 2/2005 | Stremler et al. | 705/30 |
| 2005/0108119 | A1 * | 5/2005 | Beighton et al. | 709/217 |
| 2005/0278670 | A1 * | 12/2005 | Brooks et al. | 716/5 |

\* cited by examiner

*Primary Examiner* — Vincent F Boccio

(57) ABSTRACT

This invention is to solve the high cost of IV&V by simplifying the complex logistics of project management. This is an intelligent project management system comprising a project server computer remotely accessible by a user computing device. The project server computer includes several databases: A database of electronic library which stores documents that are required by the project, a database which stores project data that reflect the state of the project, and a database which stores the user information of privileged users. Several modules are executing in the project server computer to generate the view of the project, to automatically monitor the state of the project, to verify and validate the mapping between multiple documents for requirement traceability, to automatically indicate the state of the project, to automatically provide assistance to the user, to automatically inform the stakeholder on matters related to the project, and to authenticate the privileged user. This intelligent project management system assumes that the server computer contains a standard computer operating system that includes at least a web server, an email server and a search engine facility.

5 Claims, 20 Drawing Sheets

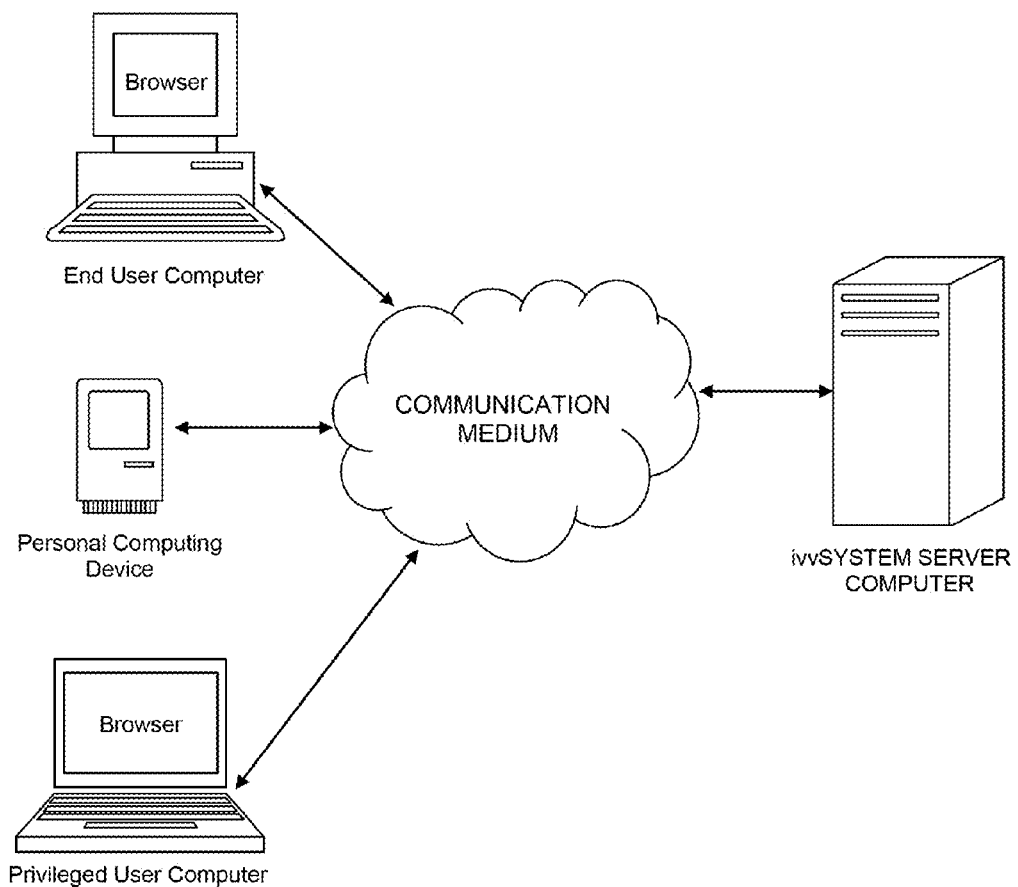
Figure 1 Conceptual Diagram of ivvSYSTEM project server system

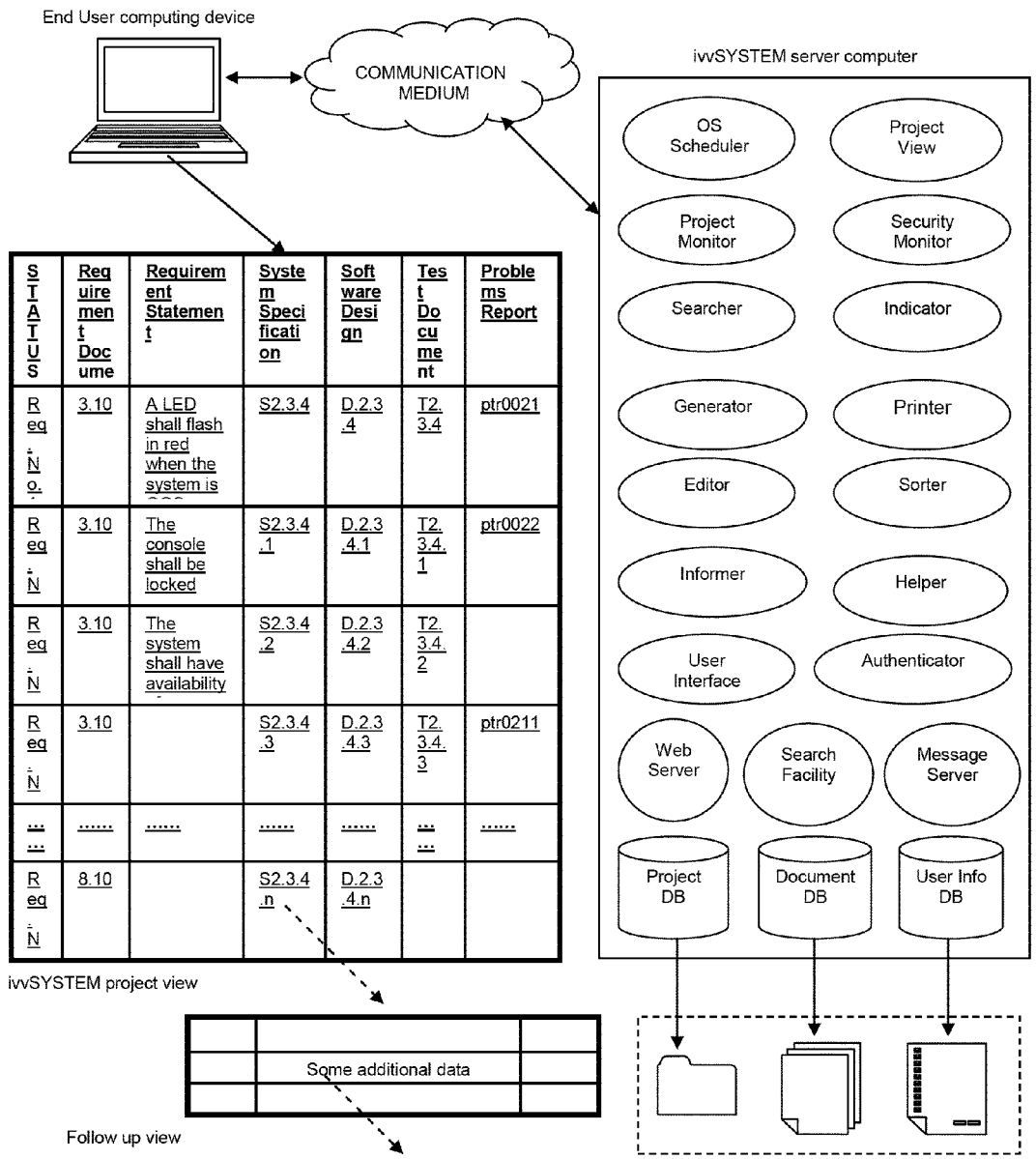
Figure 2 Functional Diagram of ivvSYSTEM project server system

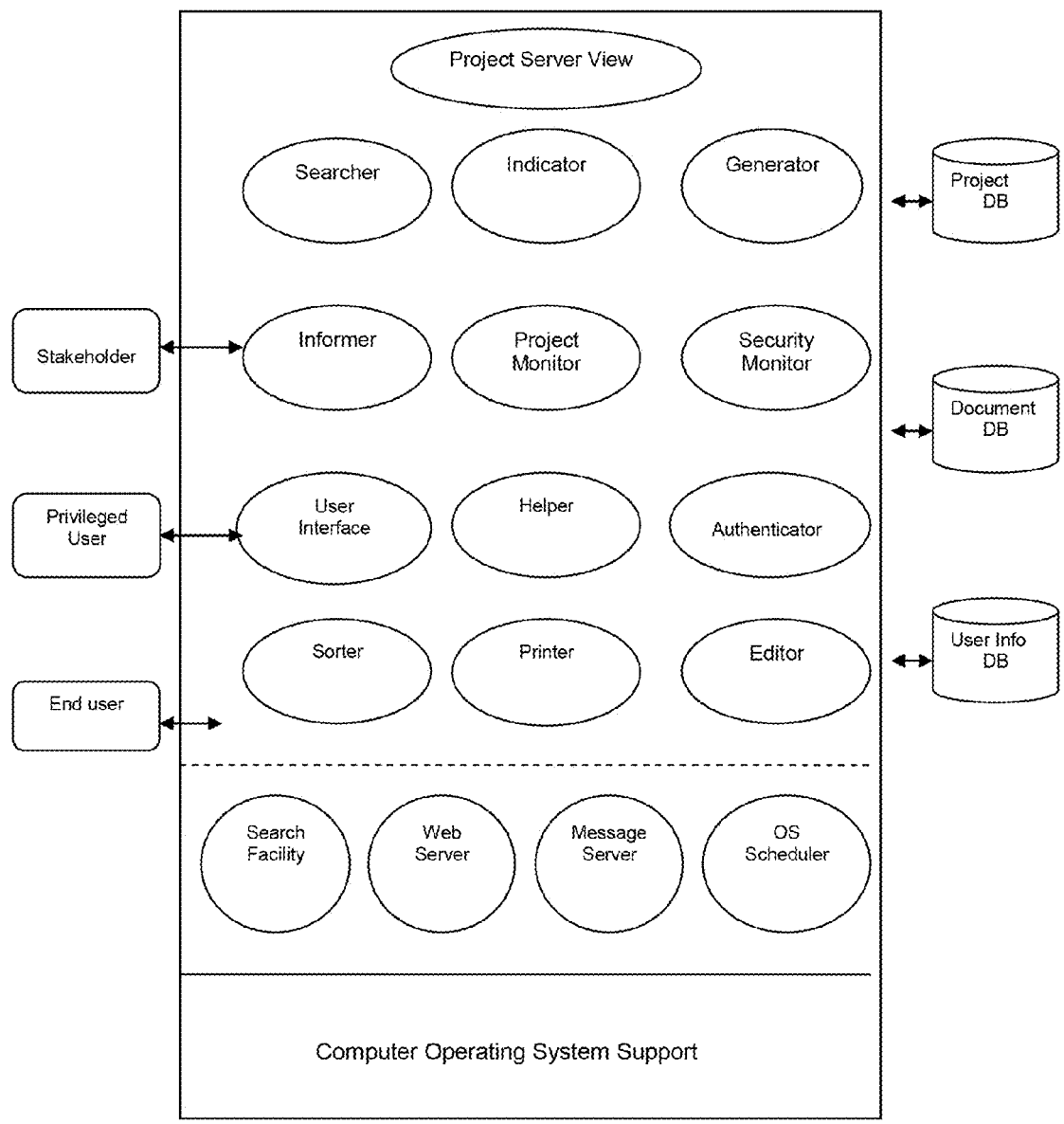
Figure 3 Functional Block Diagram of ivvSYSTEM project server system

Figure 4 ivvSYSTEM project view (an instance)

| COLUMN HEADER 0 | COLUMN HEADER 1 | COLUMN HEADER 2 | COLUMN HEADER 3 | COLUMN HEADER 4 | ...... | COLUMN HEADER i |
|---|---|---|---|---|---|---|
| ROW HEADER 1 | Zero or more Link entry 1,1 | Zero or more Link entry 2,1 | Zero or more Link entry 3,1 | Zero or more Link entry 4,1 | ...... | Zero or more Link entry i,1 |
| ROW HEADER 2 | Zero or more Link entry 1,2 | Zero or more Link entry 2,2 | Zero or more Link entry 3,2 | Zero or more Link entry 4,2 | ...... | Zero or more Link entry i,2 |
| ROW HEADER 3 | Zero or more Link entry 1,3 | Zero or more Link entry 2,3 | Zero or more Link entry 3,3 | Zero or more Link entry 4,3 | ...... | Zero or more Link entry i,3 |
| ROW HEADER 4 | Zero or more Link entry 1,4 | Zero or more Link entry 2,4 | Zero or more Link entry 3,4 | Zero or more Link entry 4,4 | ...... | Zero or more Link entry i,4 |
| ROW HEADER 5 | Zero or more Link entry 1,5 | Zero or more Link entry 2,5 | Zero or more Link entry 3,5 | Zero or more Link entry 4,5 | ...... | Zero or more Link entry 2,5 |
| ...... | ...... | ...... | ...... | ...... | ...... | ...... |
| ROW HEADER j | Zero or more Link entry 1,j | Zero or more Link entry 2,j | Zero or more Link entry 3,j | Zero or more Link entry 4,j | ...... | Zero or more Link entry i,j |

One of the follow up views

| | | Additional data i | Additional data j | |
|---|---|---|---|---|
| | | | | |

Figure 5 The Searcher module, Authenticator module and interface
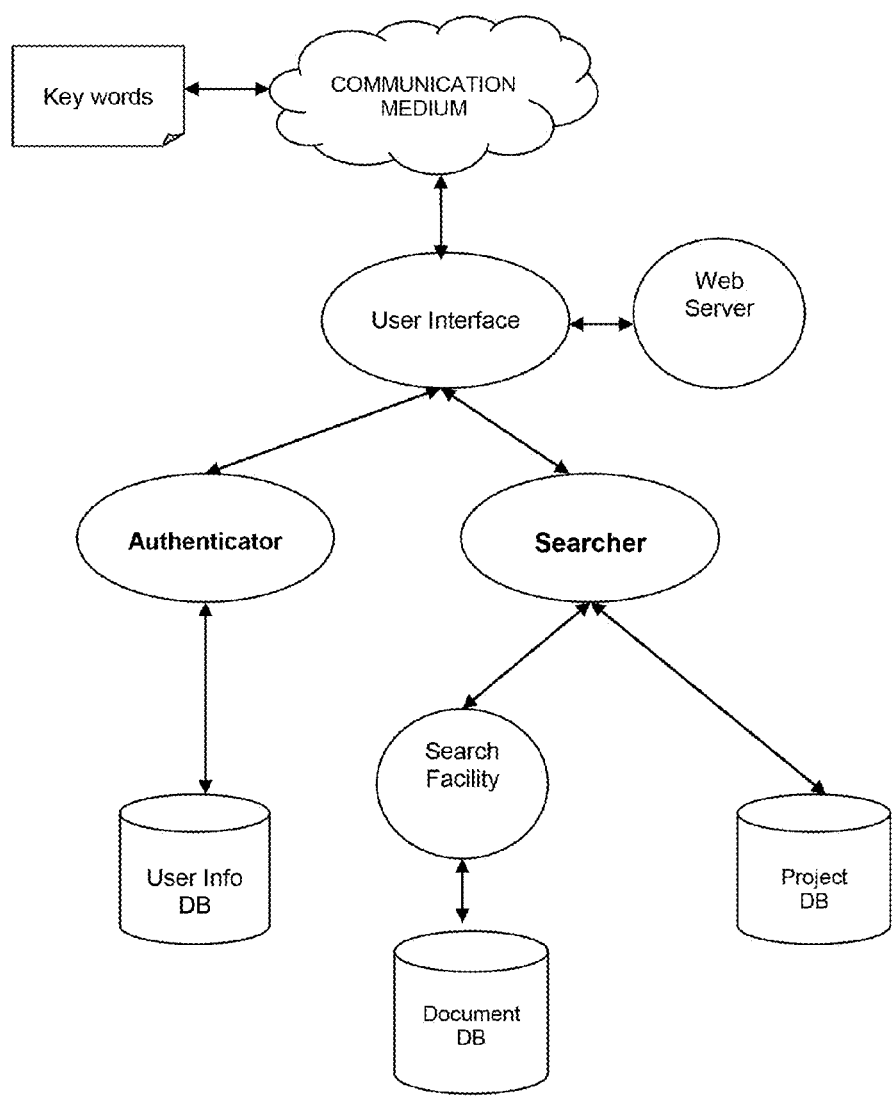

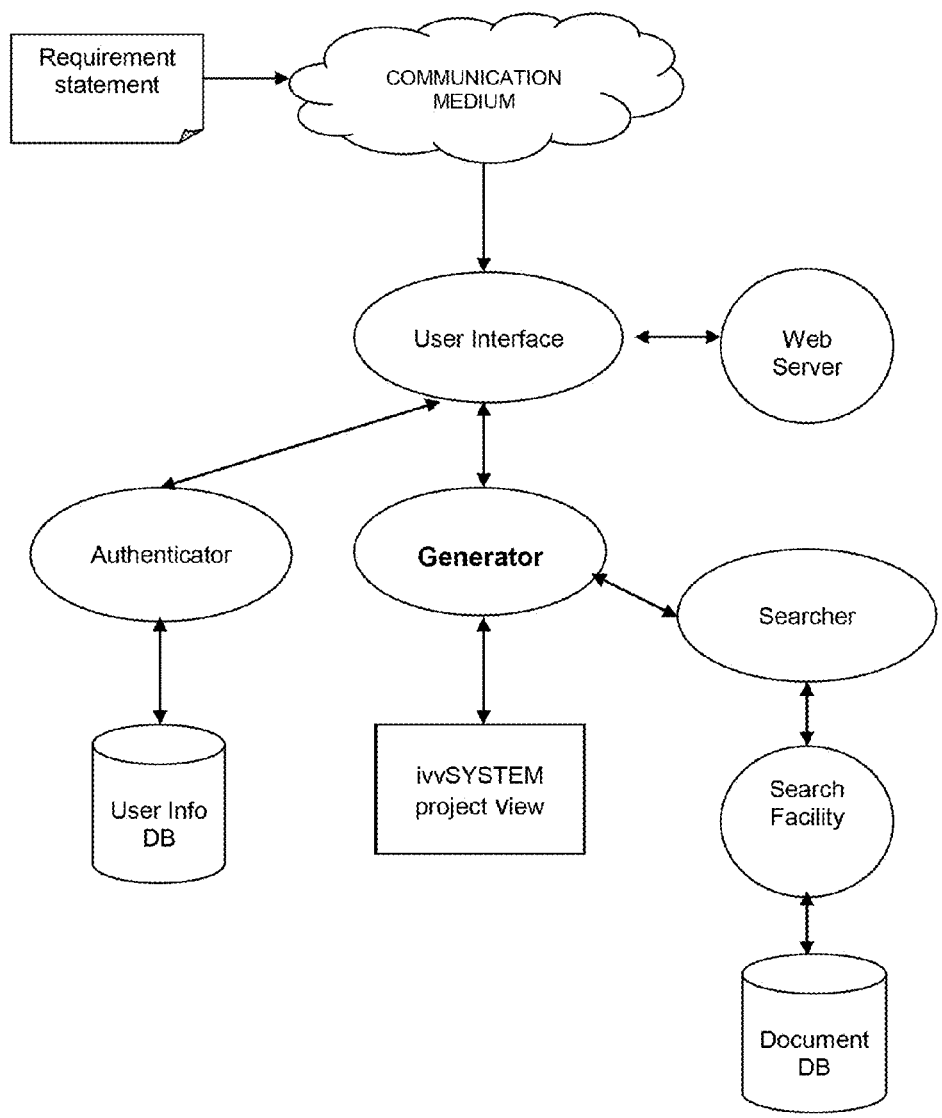
Figure 6 The Generator module, User Interface module, Searcher module, Authenticator module, and their interface

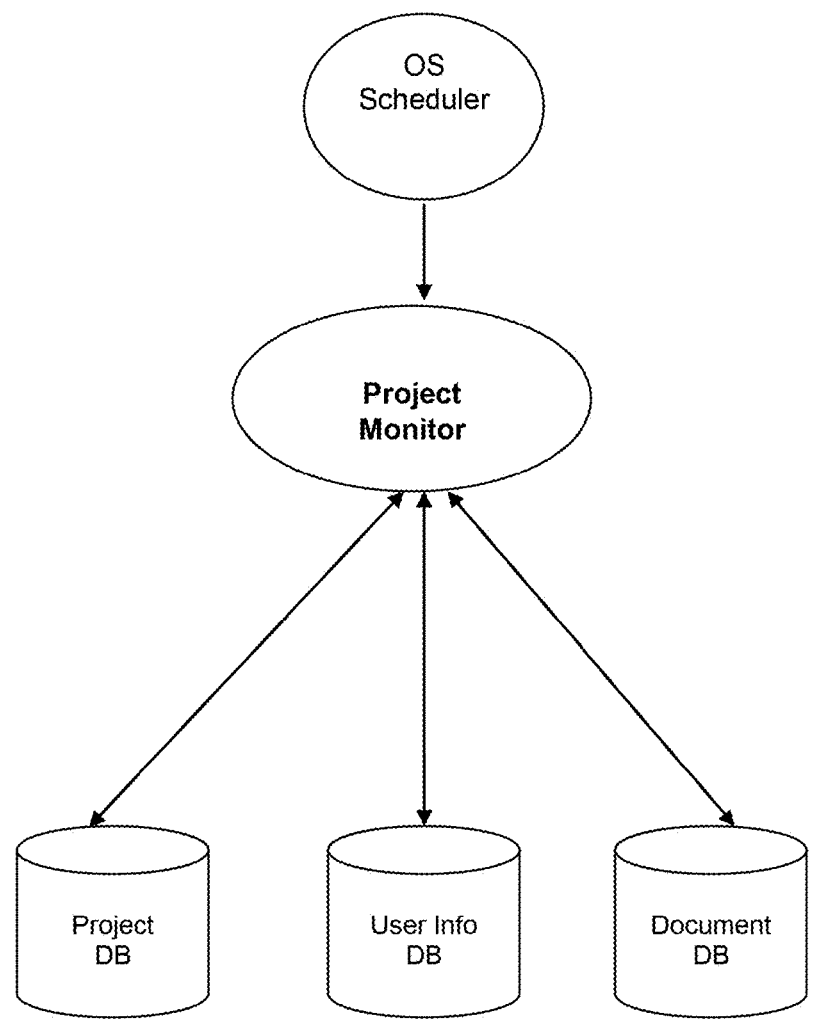
Figure 7 The Project Monitor module and interface

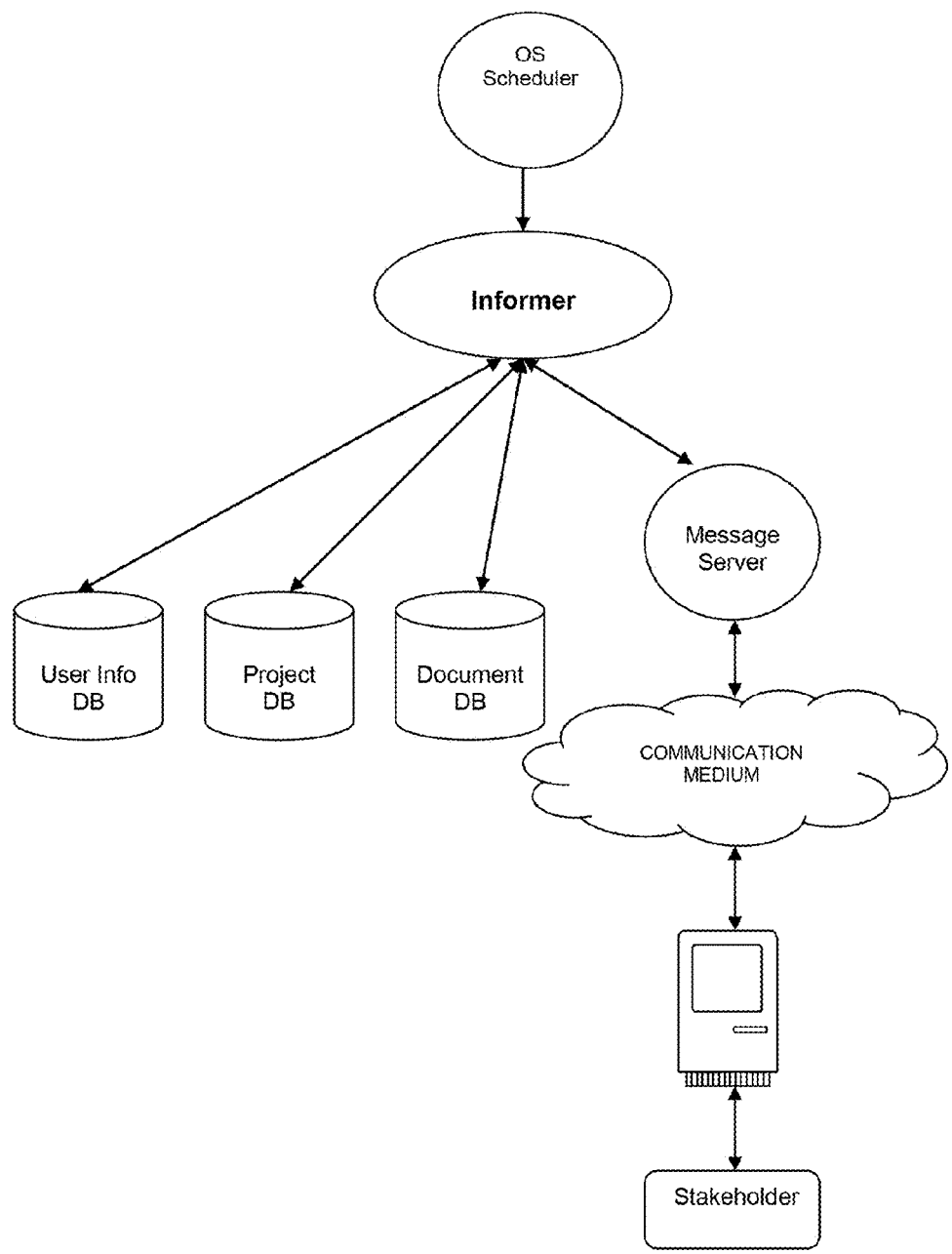
Figure 8 The Informer module and interface

Figure 9 The Indicator module and interface
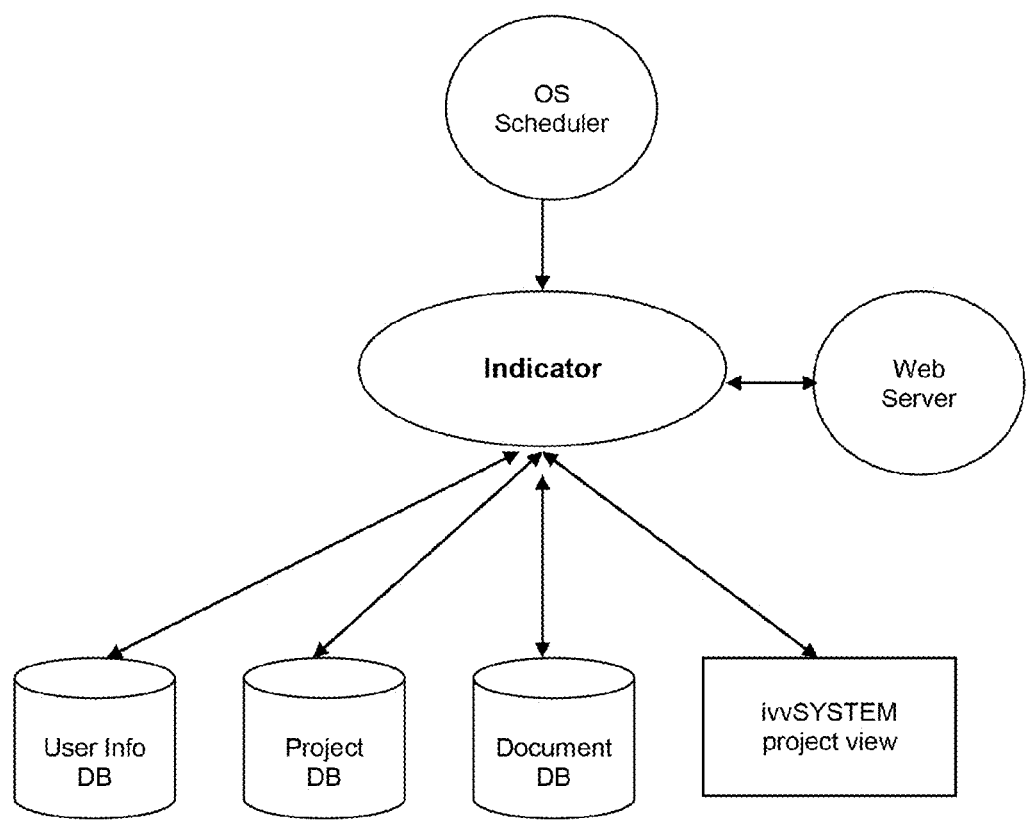

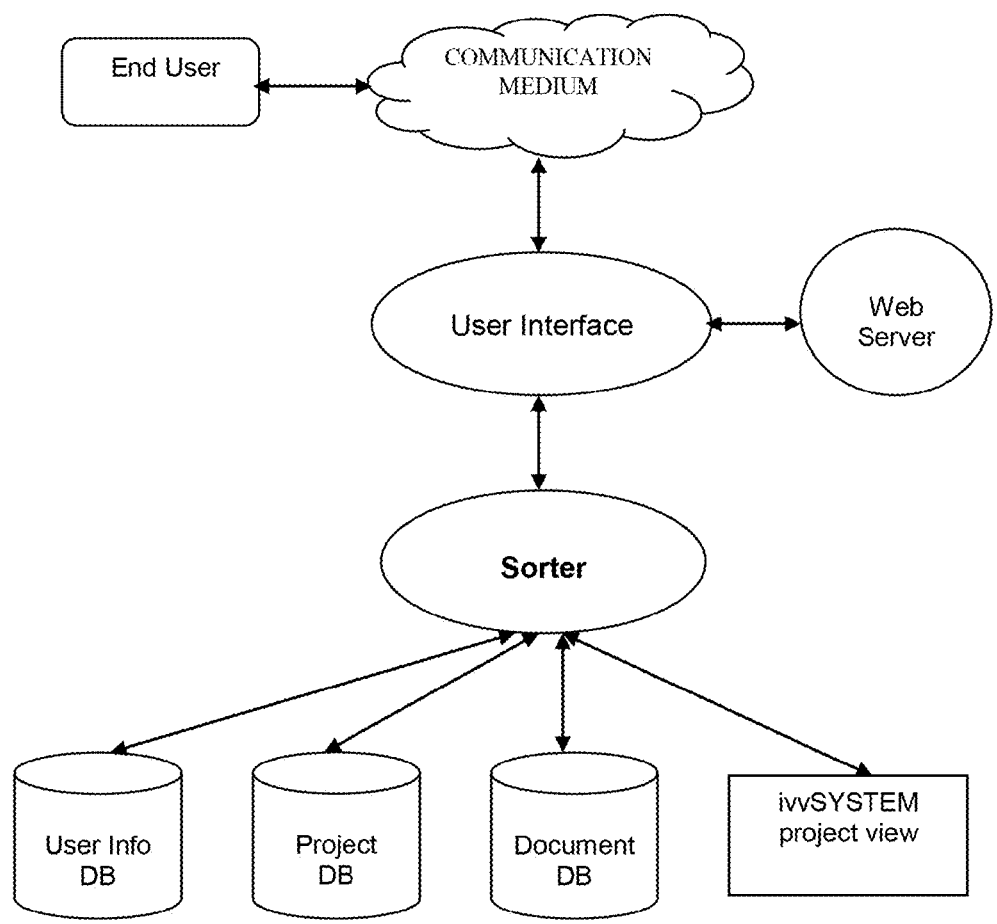
Figure 10 The Sorter module and interface

Figure 11 The Editor module and interface
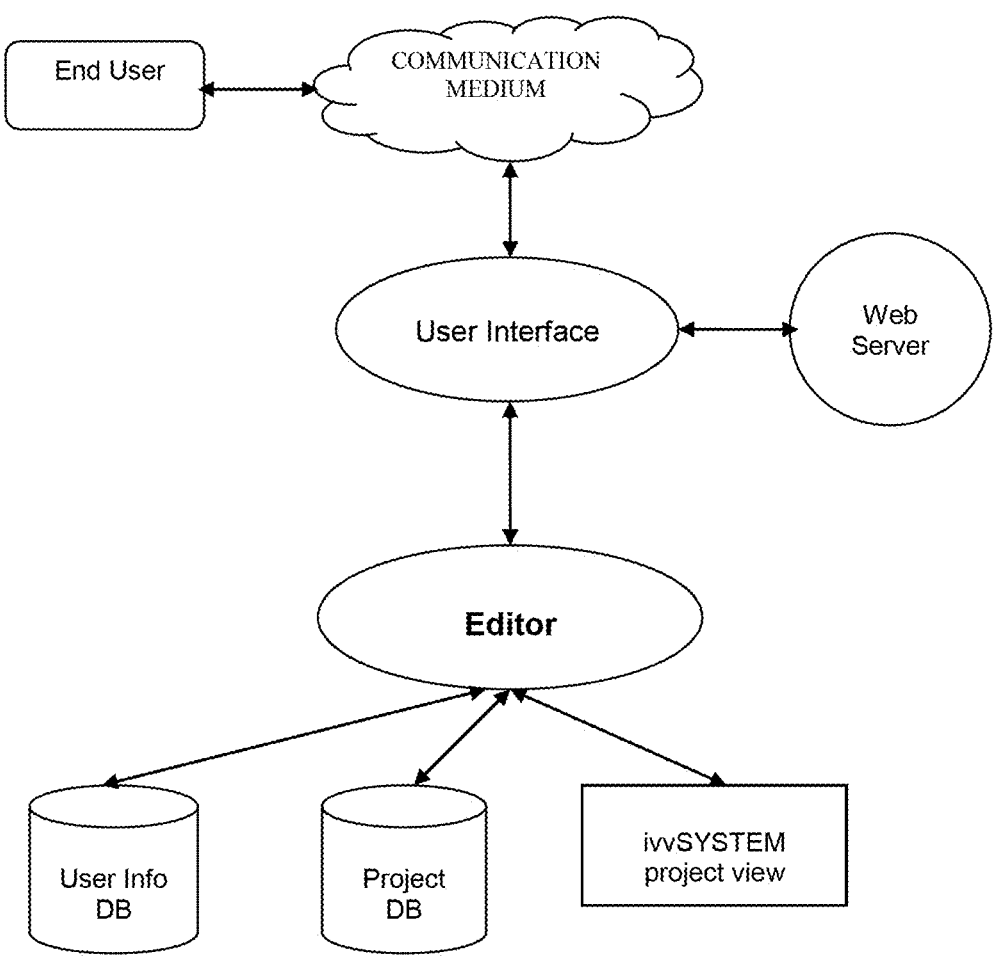

Figure 12 The User Interface module, Authentication Module, and interface
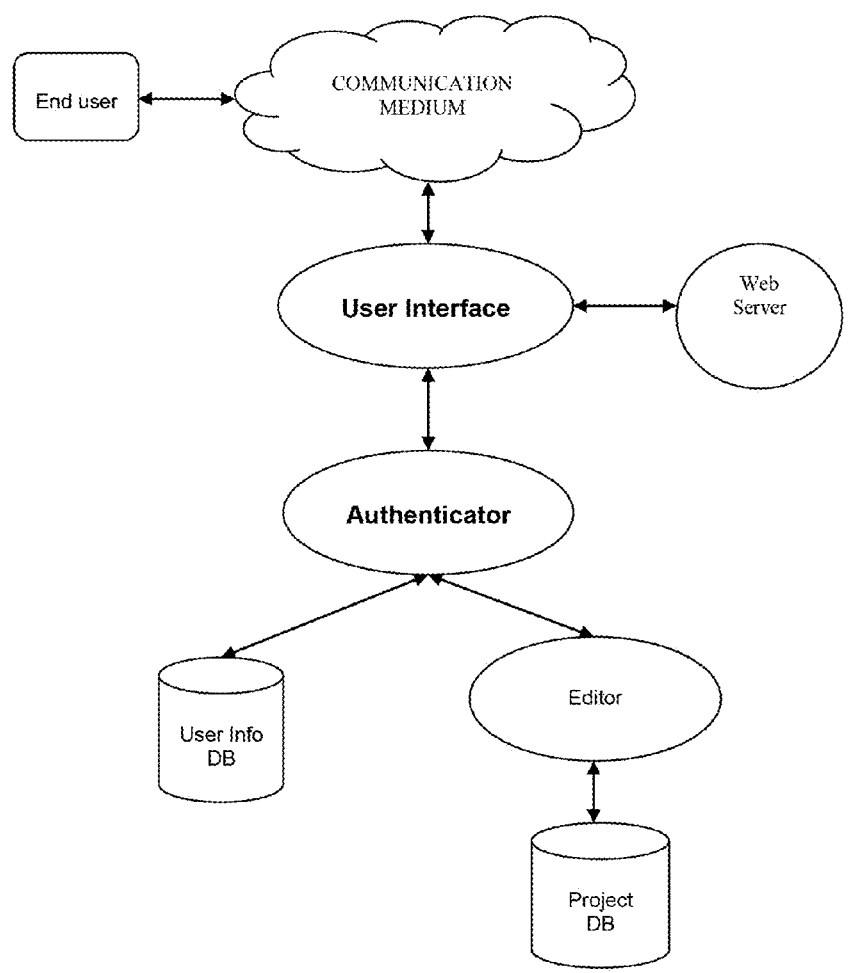

Figure 13 The Printer module and interface
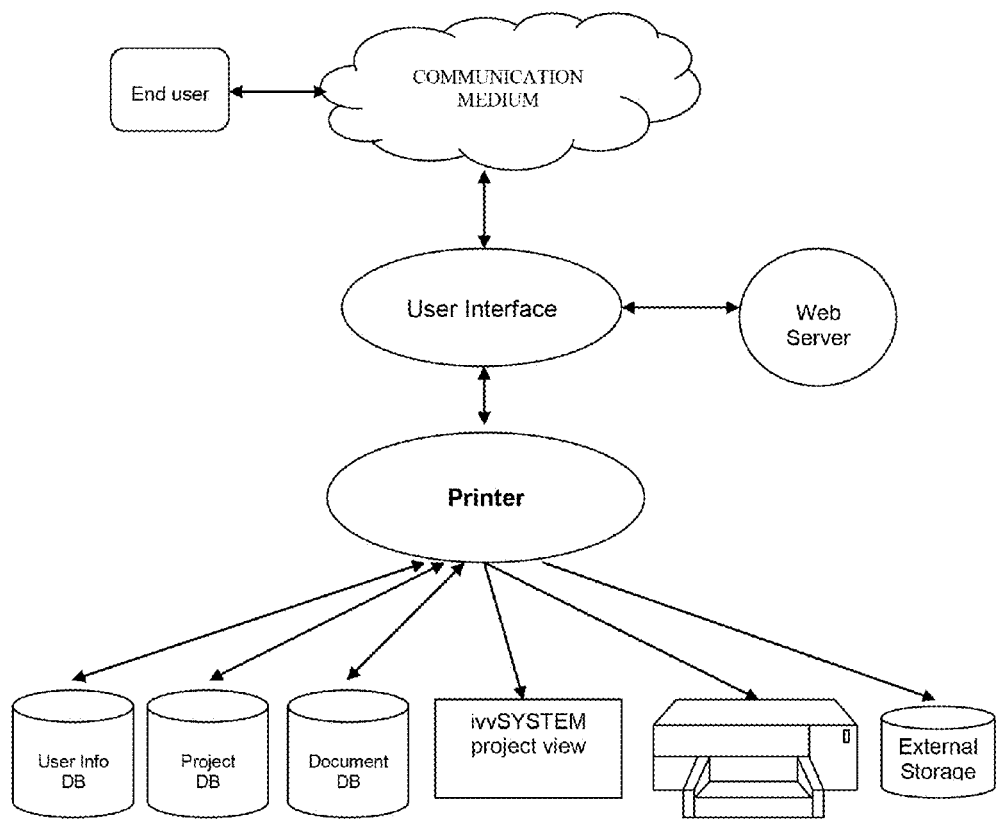

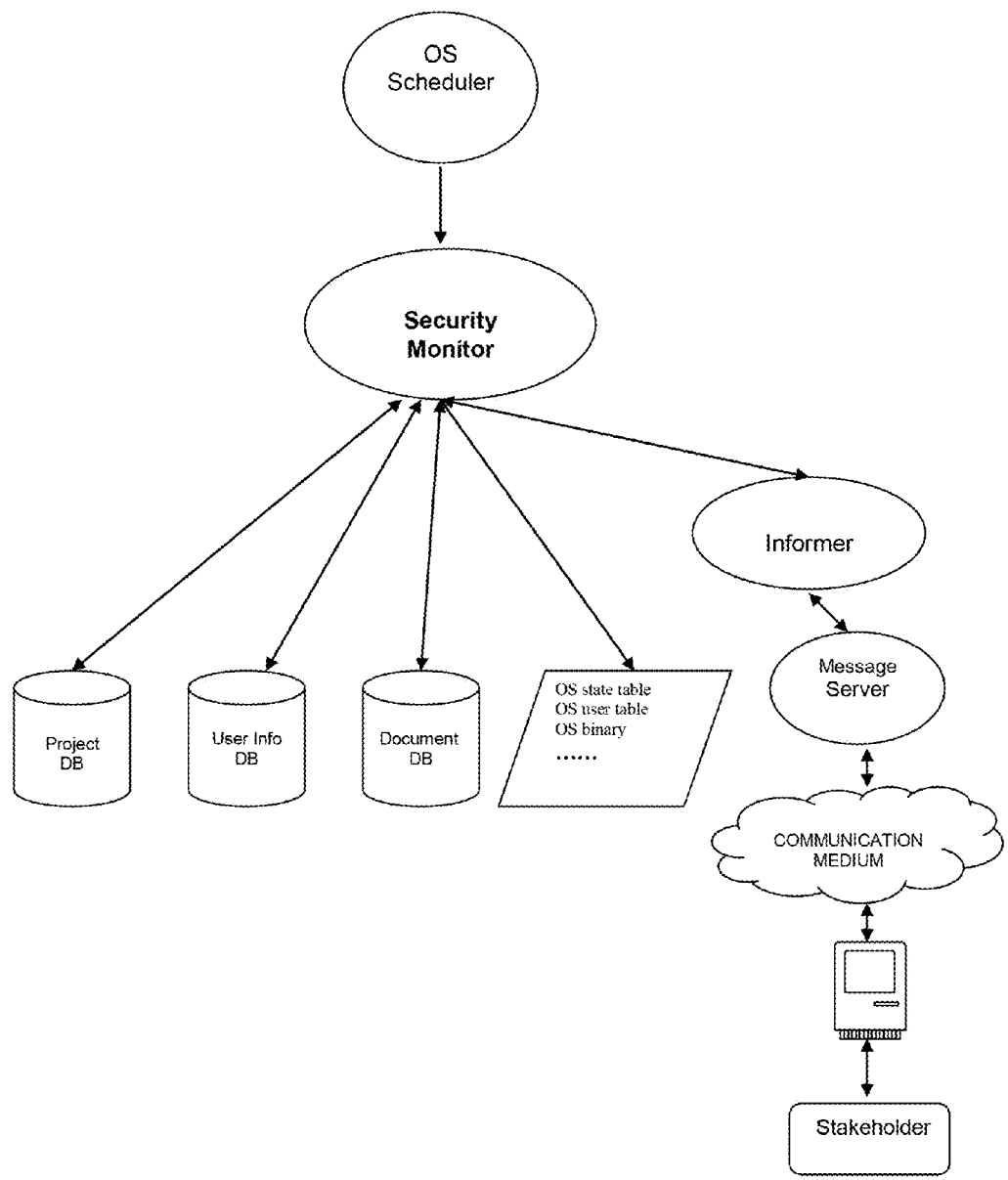
Figure 14 The Security Monitor module and interface

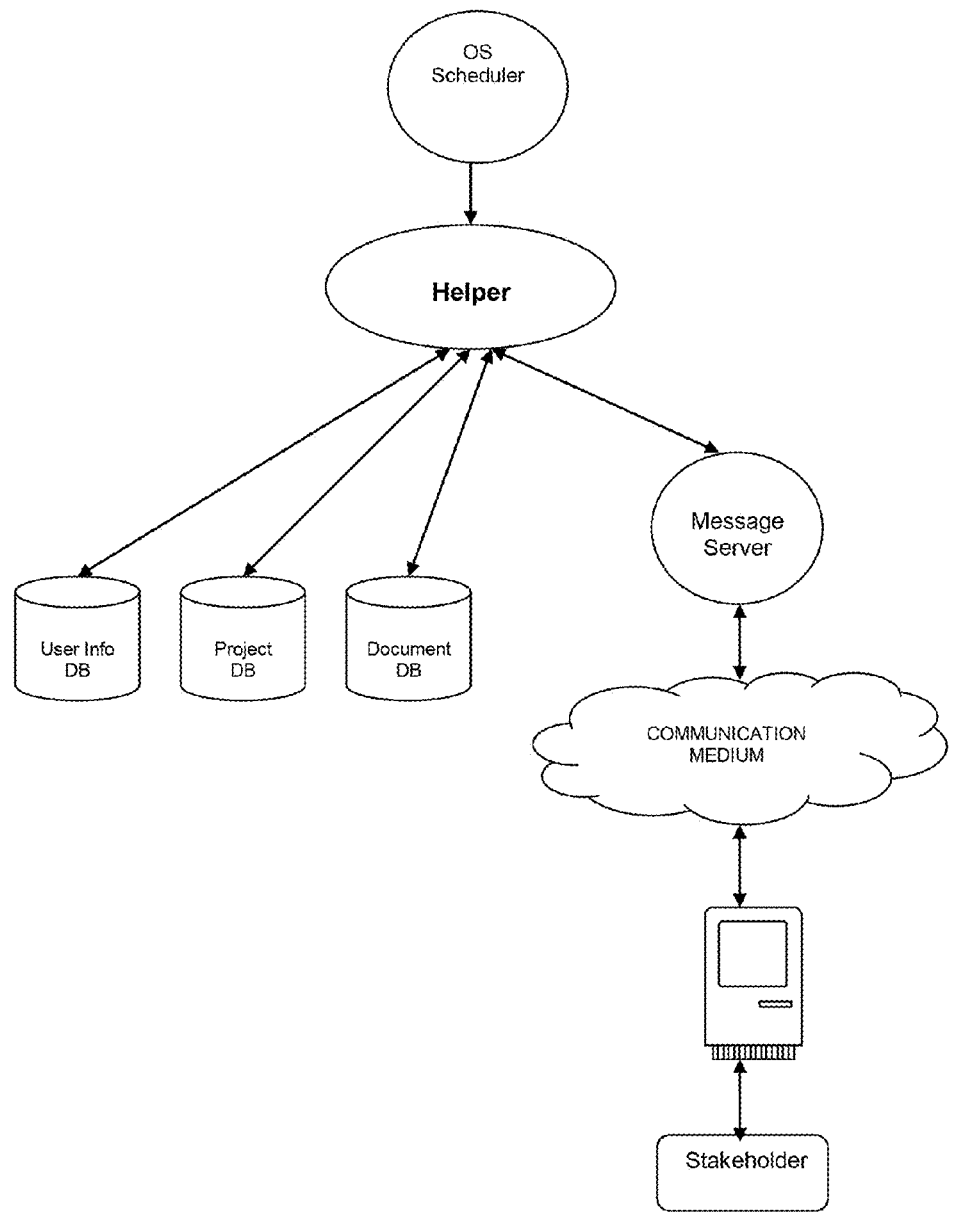
Figure 15 The Helper module and interface

Figure 16 The Helper module in ivvSYSTEM project view

| COLUMN HEADER 0 | COLUMN HEADER 1 | COLUMN HEADER 2 | COLUMN HEADER 3 | COLUMN HEADER 4 | ...... | COLUMN HEADER i |
|---|---|---|---|---|---|---|
| ROW HEADER 1 | Zero or more Link entry 1,1 | Zero or more Link entry 2,1 | Zero or more Link entry 3,1 | Zero or more Link entry 4,1 | ...... | Zero or more Link entry i,1 |
| ROW HEADER 2 | Zero or more Link entry 1,2 | Zero or more Link entry 2,2 | Zero or more Link entry 3,2 | Zero or more Link entry 4,2 | ...... | Zero or more Link entry i,2 |
| ROW HEADER 3 | Zero or more Link entry 1,3 | Zero or more Link entry 2,3 | Zero or more Link entry 3,3 | Zero or more Link entry 4,3 | ...... | Zero or more Link entry i,3 |
| ROW HEADER 4 | Zero or more Link entry 1,4 | Zero or more Link entry 2,4 | Zero or more Link entry 3,4 | Zero or more Link entry 4,4 | ...... | Zero or more Link entry i,4 |
| ROW HEADER 5 | Zero or more Link entry 1,5 | Zero or more Link entry 2,5 | Zero or more Link entry 3,5 | Zero or more Link entry 4,5 | ...... | Zero or more Link entry 2,5 |
| ...... | ...... | ...... | ...... | ...... | ...... | ...... |
| ROW HEADER i | Zero or more Link entry 1,j | Zero or more Link entry 2,j | Zero or more Link entry 3,j | Zero or more Link entry 4,j | ...... | Zero or more Link entry i,j |

Callout: "This is a Test Procedures Document. You can click here to invoke a search engine to review the document"

Callout: "Click here for Status of this Site. You need to login to view and change the status"

| Additional 1,1 | Additional 1,2 | Additional1,3 |
|---|---|---|
| Additional 2,1 | Additional 2,2 | Additional 2,3 |
| Additonal 3,1 | Additional 3,2 | Additonal 3,3 |

Callout: "Click this item and follow steps 1, 2, and 3"

Figure 17 ivvSYSTEM project view: an example of Multiple Sites Management

| SITE CODE | SITE NAME | SITE SURVEY REPORT | SITE INTEGRATION | SITE ACCEPTANCE TEST | SITE TEST REPORT | SITE SPARE LIST | REVIEW COMMENTS | SITE PTR |
|---|---|---|---|---|---|---|---|---|
| ABE | Allentown | SSR_ABE | SIIAT_ABE | SAT_ABE | STR_ABE | SSL_ABE | Comments_ABE | SPTR_ABE |
| ABQ | Albuqerque | SSR_ABQ | SIIAT_ABQ | SAT_ABQ | STR_ABQ | SSL_ABQ | Comments_ABQ | SPTR_ABQ |
| AGC | Pittsburg | SSR_AGC | SIIAT_AGC | SAT_AGC | STR_AGC | SSL_AGC | Comments_AGC | SPTR_AGC |
| AIY | Atlantic City | SSR_AIY | SIIAT_AIY | SAT_AIY | STR_AIY | SSL_AIY | Comments_AIY | SPTR_AIY |
| ANC | Anchorage | SSR_ANC | SIIAT_ANC | SAT_ANC | STR_ANC | SSL_ANC | Comments_ANC | SPTR_ANC |
| AUS | Austin Robert | SSR_AUS | SIIAT_AUS | SAT_AUS | STR_AUS | SSL_AUS | Comments_AUS | SPTR_AUS |
| AVL | Ashville (NC) | SSR_AVL | SIIAT_AVL | SAT_AVL | STR_AVL | SSL_AVL | Comments_AVL | SPTR_AVL |
| BDL | Hartford | SSR_BDL | SIIAT_BDL | SAT_BDL | STR_BDL | SSL_BDL | Comments_BDL | SPTR_BDL |
| BFI | Seattle Kings | SSR_BFI | SIIAT_BFI | SAT_BFI | STR_BFI | SSL_BFI | Comments_BFI | SPTR_BFI |
| ...... | ...... | ...... | ...... | ...... | ...... | ...... | ...... | ...... |

One of the follow up views

|  | Additional information i | Additional information j |  |
|---|---|---|---|
|  |  |  |  |

Figure 18 ivvSYSTEM project view: an example of Multiple Cases Management

[ SORT ] [ SECTION ] [ CONTEXT ] [ COMPARE ] [ To PTR ]

TOTAL PTRs: ....  KEYWORDS: System startup
DISPLAY BY: ....  SEARCH BY: ....

| Problem Trouble Report No. | Assignee Name | PTR Date | PTR Priority | PTR Status |
|---|---|---|---|---|
| PTR 3510 | Ann Bank | 07/02/2002 | 2.1 | Closed |
| PTR 3513 | Philip Ching | 05/02.2002 | 1.1 | Pending |
| PTR 3545 | Philip Ching | 08/07/2003 | 3.1 | Review |
| PTR 3576 | Mike Douglas | 04/10/2002 | 3.2 | Review |
| PTR 3579 | Mark Moller | 09/12/2003 | 4.5 | Closed |
| ...... | ...... | ...... | ...... | ...... |

| PTR 3579 | PTR 3513 |
|---|---|
| Problem Descriptions: Xxxx yyy ddd ccc ...... Problem Resolution: ....... | Problem Description: Yyy xxx zzz wwww ...... Problem resolution: ....... |

Side-by-side comparison of two PTRs (Problem Trouble Report)

Figure 19 ivvSYSTEM project view: an example of Requirement Traceability Matrix

| STATUS | Requirement Document | Requirement Statement | System Specification | Software Design | Test Document | Problems Report |
|---|---|---|---|---|---|---|
| Req. No.1 | 3.10 | A LED shall flash in red when the system is OOS. | S2.3.4 | D.2.3.4 | T2.3.4 | ptr0021 |
| Req. No.2 | 3.10 | The console shall be locked automatically is inactive. | S2.3.4.1 | D.2.3.4.1 | T2.3.4.1 T2.3.4.3 | ptr0022 |
| Req. No.3 | 3.10 | The system shall have availability of 99.99%. | S2.3.4.2 | D.2.3.4.2 | T2.3.4.2 | ptr0031 |
| Req. No.4 | 3.10 | The system shall provide an interface to a database. | S2.3.4.3 | D.2.3.4.3 | T2.3.4.3 T2.3.4.4 | ptr0211 |
| Req. No.6 | 4.15 | The user interface shall be compliant with standard. | S2.3.4.5 | D.2.3.4.5 | T2.3.4.5 | Ptr0024 |
| Req. No.7 | 4.10 | The screen interface shall use the touch entry display. | S.2.3.4.6 | D.2.3.4.6 | | |
| ...... | ...... | ...... | ...... | ...... | ...... | ...... |

One of the follow up views

| | | | |
|---|---|---|---|
| | Additional data i | Additional data j | |
| | | | |

Figure 20 ivvSYSTEM project view: an example of a Portal of Project CDRL Documents

| CDRL # | DID Title | CDRL DOCUMENTS | SOW Sections | CDRL Comments | Comment Response | CDRL Status |
|---|---|---|---|---|---|---|
| ADM001 | DID_ADM001 | Operator's Manuals | C3.2.1 | ADM001 Comments | ADM001 Response | ADM001 Status |
| ADM002 | DID_ADM002 | Engineering Change Proposals | C3.2.2 | ADM002 Comments | ADM002 Response | ADM002 Status |
| CMP001 | DID_CMP001 | System Administrator's Handbook | C3.2.3 | CMP001 Comments | CMP001 Response | CMP001 Status |
| CMP002 | DID_CMP002 | Technical Instruction Book | C3.2.1 | CMP002 Comments | CMP002 Response | CMP002 Status |
| CMP003 | DID_CMP003 | Design Change Notice (DCN) | C3.2.3.3 | CMP003 Comments | CMP003 Response | CMP003 Status |
| DOC001 | DID_DOC001 | Configuration Management Plan | C3.2.4.5 | DOC001 Comments | DOC001 Response | DOC001 Status |
| ...... | ...... | ...... | ...... | ...... | ...... | ...... |

One of the follow up views

| | | | |
|---|---|---|---|
| | Additional Data i | Additional Data j | |
| | | | |

SYSTEM AND METHOD FOR INDEPENDENT VERIFICATION AND VALIDATION

CROSS-REFERENCE TO RELATED APPLICATION

This application claims the benefits of U.S. Provisional Application No. US 61/353,843 filed Jun. 21, 2010, entitled "SYSTEM AND METHOD FOR INDEPENDENT VERIFICATION AND VALIDATION" which is incorporated by reference herein in its entirety.

FIELD OF INVENTION

The present invention relates generally to the field of project management. More particularly, the invention relates to Independent Verification and Validation (IV&V) of project management. In the following we shall call it the ivvSYSTEM server system.

BACKGROUND OF THE INVENTION

Independent Verification and Validation (IV&V) is a process for project management due diligence. Many organizations are overloaded by the complex logistics and high cost of project development and management. IV&V scope of work includes the process of ensuring project requirements traceability. It can range from strategic planning and implementation to manage the workflow across the life cycle of a project. For large project it includes periodical formal configuration audits, reviews, data collection, and reports generation. The core of IV&V tasks is the mapping between multiple project related documents. The understanding of their mutual relationship is critical to the success of the project, and a cost effective mapping between them based on requirement statements is a challenge that dictates the cost of the project management.

Successful management of a large project must perform the IV&V process. It is a labor intensive process that can incur great cost. The high cost of IV&V is generally accepted by default in the industry. The traditional IV&V methods of operation are largely manual procedures and independent verification can only do statistical sampling for a large project. When it comes to requirements audit the IV&V tasks can include activities like physically chasing from documents to documents for tracing the requirements statements. For a large project the stakeholders are usually wide spread in geographical locations. Frequent traveling for meetings to resolve project related issues are often required. However, many issues cannot be resolved timely in a single meeting because they depend on information that cannot be obtained quickly to support a right decision in time. To have the stakeholder to collaborate in an orderly manner needs a system and method to obtain the precisely needed information quickly. All these factors can incur huge cost and can impact or delay project milestones.

This invention will greatly simplify project management and its associated IV&V process. It implements a system and method that can cut the cost in an order of magnitude by automating the mapping of requirement statements between multiple documents and creates centralized global views open to all stakeholders of the project. ivvSYSTEM is an automated and intelligent system allows organizations to do a thorough, complete, and efficient IV&V processes.

BRIEF SUMMARY OF THE INVENTION

The present invention is an intelligent computer system for project management called ivvSYSTEM. It performs project management including the Independent Verification and Validation (IV&V) processes for multiple projects. It is also called a ivvSYSTEM server computer or a ivvSYSTEM server. An ivvSYSTEM server computer consists of hardware and software. Its hardware includes at least one computer system in a network environment. Its software can include built-in application software and at least one operating system.

The ivvSYSTEM project server embodies several different technologies to provide its capabilities to conduct IV&V of project management processes. It embodies web server technology, message server technology, search engine technology, operating system technology, and document processing technology. The ivvSYSTEM greatly simplifies the complex logistics of project management.

The user community of the ivvSYSTEM consists of general users and privileged users. A user can connect to the ivvSYSTEM server via a computing device including the use of mobile device. Once connected, the user can view various states of a project. The ivvSYSTEM provides web based user interface to communicate with the user online. It provides authentication and authorization of the user to access the system. It uses message server (e.g., email server) to further communicate with the user. User community can simultaneously or sequentially view web page displays for project status and data. Users can review and make comments. User can sort and update the status of project data items to manage the project. User can create and change project items via an ivvSYSTEM module. User can also request to print the viewed, the sorted, or the organized project data or to be stored in a specific location. The ivvSYSTEM server provides a search engine facility to allow user to "search, compare and contrast" of multiple project documents and to review the documents. This technology can quickly map the sentences across multiple documents. The search engine facility supports the generating of project views.

The ivvSYSTEM project server computer continuously monitors and periodically reports the state of the project to indicate the progress of a project. The ivvSYSTEM continuously monitors and periodically reports the consistency of the project data and the integrity of the project documents. The ivvSYSTEM project server automatically helps the user to understand and to visualize the project data by presenting various project views to the user. The ivvSYSTEM server continuously monitors and automatically reports the security state of the server computer.

The ivvSYSTEM project server uses at least one intelligent database to stores project data. Project data include project documents, project state data, project reports, and results from the search engine, predefined project rules, user credentials, and user information. The database has the capability of conducting online maintenance and updating of the project data.

BRIEF DESCRIPTION OF THE DRAWINGS

FIG. 1 shows a conceptual diagram of the ivvSYSTEM project server system.

FIG. 2 shows a functional Diagram of the ivvSYSTEM project server system.

FIG. 3 shows a functional block diagram of the ivvSYSTEM project server system.

FIG. 4 shows a ivvSYSTEM project view diagram which consists of multilevel views with project information.

FIG. 5 shows the Searcher module and its functional relations with the User Interface module, the Authenticator module, User Info database, the Document database, and the Project database.

FIG. 6 shows the Generator module and its functional relation with the User Interface module, the Searcher module and the Authenticator module.

FIG. 7 shows the Project Monitor module and its functional relation with the Project database, and the Document database.

FIG. 8 shows the Informer module and its functional relation with the Project database, the Message server, and the stakeholders.

FIG. 9 shows the Indicator module and its functional relation with the Project database and the activation of the color code to the ivvSYSTEM project view.

FIG. 10 shows the Sorter module and its functional relation with the Project database and the ivvSYSTEM project view.

FIG. 11 shows the Editor module and its functional relation with Project database and the ivvSYSTEM project view.

FIG. 12 shows the User Interface module and its functional relation with the Authenticator module, the Editor module and the User Info database.

FIG. 13 shows the Printer module and its functional relation with the Project database, the ivvSYSTEM project view and a physical printer and an external storage device.

FIG. 14 shows the Security Monitor module and its functional relation with the Project database, Document database, User Information database, and other functional modules.

FIG. 15 shows the Helper module and its functional relation with the Project database, the Message server, and the user.

FIG. 16 shows the Helper module in action. User moves the cursor over an item on the ivvSYSTEM project view, the system will explain to the user on what is the item, how does it function, etc.

FIG. 17 shows a preferred embodiment of ivvSYSTEM project view which is an example on Multiple Site Monitoring and Management. Herein, the ivvSYSTEM server is represented and visualized by a web based dynamic matrix to serve as a Master Site Control Center of all sites. Each row represents a particular site. Each column represents a common procedure required for all sites. Each entry is a link to specific piece of information. A link can be site license, site survey report, site test procedure, and site test report. The ivvSYSTEM server computer implements a color code to indicate the status of a particular requirement of a site. This dynamic matrix gives the user (e.g., project manager and all stakeholders) an easy view on the logistics of each site.

FIG. 18 shows a preferred embodiment of a Multiple Cases Management. Herein, the ivvSYSTEM project view is represented by a web based Matrix consist of all trouble tickets where each row represents a particular case (e.g., a ticket). Each column represents an attribute of a case. An entry can be a link to a description of a case, the date, the ownership, the priority of the case. A built-in facility should be provided to sort the cases based on dates, priority, assignees, or case IDs. Another built-in facility should be provided to allow user to search and compare a case against the requirement document or design documents.

FIG. 19 shows a preferred embodiment of a Requirement traceability Matrix. Herein, the ivvSYSTEM project view is represented by a Requirement Traceability Matrix (RTM) where each row represents a contractual requirement. Each column represents a specific stage in the life cycle of a requirement. Each entry is a link to a specific piece of information in a related document (e.g., software design document, etc.). The matrix populates as the project progresses. The ivvSYSTEM server computer will also implement a color code to indicate the status of a requirement at each stage of the development.

FIG. 20 show a preferred embodiment of a Portal of Project Documents. Herein, the ivvSYSTEM Project View is represented by a web based dynamic matrix where each row represents a contractually required document. Each column represents a development stage of a document. Each entry can be a link to a related document, or a review comment against that document. The ivvSYSTEM server computer will implement a color code to indicate the progress of a required document. The overall color view can indicate the completeness of the project.

DETAILED DESCRIPTION OF THE INVENTION

This invention is an intelligent project management system with automatic and perpetual functions to process and link together project information. The ivvSYSTEM project server uses web based multi dimensional matrix comprising a search engine technology to search, compare, and contrast multiple documents. The said system can quickly map sentences between multiple documents. The said server can monitor, indicate, and inform the progress of a project towards its project milestones during the life cycle of the project. The invention is to quickly synchronize relevant paragraphs and sentences from multiple documents based on each requirement statement of the project to achieve cost-effective project management. Specifically the ivvSYSTEM server system has functional modules described in FIG. 3 for a functional block diagram of ivvSYSTEM.

The ivvSYSTEM server system provides multilevel project views via ivvSYSTEM project view illustrated in FIG. 4. Each view is a visual representation of the state of a project. User can click a project item in the view to go to the next level of the project view and this step can continue to more multilevel views of the project. The said view is processed and generated by the Generator module and supported by a web server. The said view is a web based multi dimensional matrix where each row represents a project entity. Each column represents a specific stage in the life cycle of a project entity. Each entry has a link to a piece of information in a specific project document. The said view populates as the project grows to its completion in meeting the project milestones.

The ivvSYSTEM server system has a module called the Searcher module described in FIG. 5. The said module uses a search engine facility to conduct search, compare and contrast of project documents stored in the Project Document Database. The said Searcher module will receive inputs from the user via the User Interface module. It allows authorized users to review project documents and to trace project requirement statements through multiple project documents. The said module will store the result in the Project Database for further processing and use by other functional modules in the system.

The ivvSYSTEM server system has a module called the Generator described in FIG. 6. The said module can create a project view, the ivvSYSTEM project view, based on user input. It can automatically generate an initial IV&V trace based on an input requirement statement. The Generator module accepts a request form the user, via the User Interface module supported by the Web server. In that process the Generator module will first call the Authenticator module to authenticate the user for authorization purpose. After the user has been authenticated, the said module will call the Searcher module to get the required information with respect to the said input requirement statement. The said Generator module receives output from the Searcher module to be incorporated in the said ivvSYSTEM project view.

The ivvSYSTEM server system has a module called Project Monitor module described in FIG. 7. The said module automatically and perpetually monitors the state of the ivvSYSTEM server based on predefined rules. The said Project Monitor module records the result of its monitoring in the Project Database for further processing or use by other functional modules in the system. The said Project Monitor module is activated automatically and periodically by a scheduler executing in an operating system running in the ivvSYSTEM sever computer.

The ivvSYSTEM server system has a module called the Informer module described in FIG. 8. The said module automatically notifies the user on matters related to the project. The said notification includes, but not limited to, the status of a project requirement, project problems, and early warning signs regarding the progress of project development. The said Informer module is automatically activated by a scheduler from the base operating system executing in the ivvSYSTEM server computer. The said Informer module will periodically exam the Project Databases and make decisions if there is any project matter that needs to be notified to relevant users based on project schedule and predefined rules. The said module will call the Message Server running in an operating system in the ivvSYSTEM server computer to inform the user through electronic mail, text message, audio and video messages via the communication medium.

The ivvSYSTEM server system has a module called the Indicator module described in FIG. 9. The said module incorporates color codes that automatically changes colors of project items in ivvSYSTEM project view based on information from the Project Databases. The said Indicator module is activated automatically and periodically by a scheduler running in an operating system in the ivvSYSTEM server computer. Wherein, the said Indicator module will periodically read data from the Project Database and process the data against the predefined project rules. The said Indicator module will then decide which color code to apply to specific items in the ivvSYSTEM project view. This capability gives user the benefit of visualizing project states via the ivvSYSTEM project view.

The ivvSYSTEM server system has a module called the Sorter module described in FIG. 10. The said module provides various sorting capabilities on demand from the user. The said Sorter module receives request from the user via the User Interface module supported by the Web server running in the ivvSYSTEM server computer. The said sorting function can be applied to data in the rows or data in the columns in the ivvSYSTEM project view. The output from the said Sorter module will be displayed and reflected in the ivvSYSTEM project view. This sorting capability of the ivvSYSTEM server computer helps user to visualize the data and visualize the state of the project.

The ivvSYSTEM server system has a module called the Editor module described in FIG. 11. The said module receives request from user via the User Interface module controlled by the Web server running in the ivvSYSTEM server computer. Assume the user is authenticated and authorized to conduct the requested editing, the Editor module proceeds to validate the request. If the request is valid the said Editor module will execute and honor the request. The User Interface module is controlled by the Web server running in the ivvSYSTEM server computer and the output of the Editor module is stored in the Project Database and the result will be incorporated and reflected in the ivvSYSTEM project view.

The ivvSYSTEM server system has a module called the Authenticator module described in FIG. 12. The said authenticates the user login to the system. A user can request for editing a project item in the ivvSYSTEM project view or changing the status of a project entry provided if the user has passed the authentication process and the authorization process of the said module. The said Authenticator module receives input from the user via the User Interface module supported by the Web server. The said Authenticator module will read user data via the User Information Database and conduct an authentication process followed by an authorization process based on user credential stored in the User Information Database. User will be notified the result of the said processes.

The ivvSYSTEM server system has a module called the Printer module described in FIG. 13. The said module receives request from the user via the User Interface module supported by the Web server. The Printer module provides printing service to the end user. The said Printer module can print special data stored in the Project Database based on user request and based on authorization granted by the Authenticator module. The said Printer module can also archive the printed information to an internal or external disk drive based on a user request or as scheduled system event.

The ivvSYSTEM server system has a module called Security Monitor module described in FIG. 14. The said module automatically and periodically monitors the security of the ivvSYSTEM server computer based on predefined rules. The said Security Monitor module verifies the Document Database for integrity of the project documents. It also exams Project Database based on a set of predefined security policy (or rules) for its security consistence. It also compares the current state table of the computer operating system against a set of predefined rules to determine if there is any unrecognized process (or programs) is running on the ivvSYSTEM server system. The Security Monitor module also monitors the User Table in the base operating system to determine if there is any unrecognized user currently login to the ivvSYSTEM project server system. The said module will report to the server administrator in case there is any inconsistence detected or any malicious act of some kind. The said Monitor module is further configured to perform intrusion detection, and monitor system network traffic and report any unusual pattern of traffic. The said module is further configured to manage up to date system patches for security purpose. The Security Monitor module is automatically activated by a scheduler in an operating system running in the ivvSYSTEM server computer.

The ivvSYSTEM server system has a module called the Helper module described in FIG. 15 and FIG. 16. The said module provides automated help on project items for the user. When the end user places his or her pointing devices at a particular place in the ivvSYSTEM project view the said Helper module will automatically provides explanation for user to understand the said project item. It reads project information from the Project Databases to help the user online and off-line. The said Helper module will help the user throughout the multilevel views as represented in the ivvSYSTEM project view. The said Helper module will accept user inquiries, via the User Interface module, in the form of input questions. The Helper module will automatically notify the Informer module for a follow up question that was initiated by the user. The said Helper module is supported by the Web server running in an operating system under the ivvSYSTEM server computer.

The ivvSYSTEM server system has a module called the User Interface module described in FIG. 12. The said module provides a web based user interface capability. The said user interface capability accepts user request. The said user interface is configured to provide login process for privileged user to login to the ivvSYSTEM server computer. The said User Interface module is further configured to process user request on viewing the status of project item, changing project item, and adding project items to the ivvSYSTEM project view. The said User Interface module provides web forms to collect user inputs including but not limited to login form, keywords input form, user input forms, document request form, sorting request form, and error messages for the user while communicating with the user. The said module is supported by the Web server running in an operating system in the ivvSYSTEM server computer.

The ivvSYSTEM server system has at least three databases as described in FIG. 3 for a functional block diagram. The said system has a Project Database which contains information on the state of a project. The said database is used by the ivvSYSTEM project view. It is also used by the Informer module to exam the state of the project. The said database also contains various search result from the search engine facility which is used by the Searcher module to process requirement related search. The said database also contains predefined rules for the Project Monitor module to exam and to compare project data. In another embodiment the said database contains a set of predefined rules for the Security Monitor to exam and to make decisions on the security state of the ivvSYSTEM server computer. The said database also contains information on reports from the Project Monitor module which will be used to inform the stakeholders on matters related the project. The said matters can include but not limited to scheduled meetings, project status, early warning messages. The said database has a capability of updating the data in real time via web forms. In synergy with the Security Monitor module the said database has a built-in intrusion detection system to ensure the integrity of the project data.

The ivvSYSTEM project server computer has a Document Database which contains all the documents required by the project. The said database is an electronic library that allows the search engine facility to search, compare and contrast documents that are mandated by the project. The said database is used by the Project Monitor module, the Searcher module, and the Generator module. The said database has a capability of updating the data in real time via web forms. In synergy with the Security Monitor module the said database has a built-in intrusion detection system to ensure the integrity of the project documents.

The ivvSYSTEM project server computer has a User Information Database which contains user information. The said database contains user data includes but not limited to user name, address, phone numbers, organization name, and organization unit. The said database is further configured to include user's email address. The purpose of the data is to authenticate and authorize the user. The said database contains information for the Security Monitor module to exam the security state of the said ivvSYSTEM server computer. In another embodiment, the purpose of the said database is to contact or inform the user on matters related to the project. The said database has a capability of updating the data in real time via web forms. In synergy with the Security Monitor module the said database has a built-in intrusion detection system to ensure the integrity of the user information data.

Special applications of this invention are given by examples described in FIGS. 17, 18, 19, and 20. FIG. 17 describes an application on Multiple Sites Monitoring and Management. FIG. 18 describes an application on Multiple Cases Management. FIG. 19 describes an application on Requirements Traceability Matrix. FIG. 20 describes an application on Project Document Portal to manage all project related documents.

TERMS AND DEFINITIONS

Computer operating system—It is a system that runs the applications software in a computer. A common understanding will be Windows, MacOS or UNIX like operating system.

Computing device—This includes computers, laptops computers, personal device like PDA, and Cell phone.

CDRL—Contract Data Requirement List (CDRL) is a term used in contract to indicate to define a list of contractual required documents.

Component—A component of a method is part of the method that makes the method unique in its capability.

IV&V—It stands for Independent Verification and Validation. Also know as IV&V. It is part of the due diligence in managing a project.

ivvSYSTEM—This term is used in this invention to represent an intelligent project management system. It can also appear as the following names: ivvSYSTEM server, ivvSYSTEM server system, ivvSYSTEM server computer, or ivvSYSTEM project server.

Module—A module in a computer system is a program or function that is part of the entire system.

Multi dimensional matrix—A multi dimensional matrix is a web based multi level matrix where each entry of the matrix is linked via the web to another object which can be another multi dimensional matrix, a document, a sentence, or a statement. It is multi dimensional because the web link can be followed in finite number of steps.

Perpetual—A process is regarded as perpetual if it is continuous in operation. For computer server system this concept only applies to if the said computer system has powered on and is in service.

Project Databases—This term includes the Project Document database, the Project data database, and the User Information Database.

Project View—A project view is a means of visualizing the on-going status of the project. It is a representation of the state of the current project. In this invention it is physically represented by a web page(s) that is a dynamic matrix. Herein, we use the term ivvSYSTEM Project View. Examples of Project View can be further explained by the following figures:
a. FIG. 17 Multiple Site Monitoring and management
b. FIG. 18 Multiple Case Management
c. FIG. 19 Requirement Traceability Matrix
d. FIG. 20 Portal of Project Documents Process—A process is a software program in execution in a computer under control of the kernel of the operating system.

Real time system—A system is a real time system if it is continuously running

Real time updating of database—A capability of updating project data in real time without taking the database off-line for maintenance and without interrupting to the service provided by the computer system.

Requirement Statement—A requirement statement is usually a sentence specified in a contract, in a Statement Of Work (SOW), or in project specification. It is a contractual obication.

Requirement Traceability Matrix (RTM)—A Requirement Traceability Matrix is the core of the IV&V work. It allows each contractual requirement statement to be traced from one document to another to ensure that a requirement is in fact allocated, implement, test and deployed. Note: FIG. 19 is a good example.

Search engine facility—A search engine facility is a facility that employs search method to find some information. For example, its capability can be search, compare, and contrast. Where search can be via key words or phrase search; compare can be cross-reference of specific sentence across multiple documents; and contrast can be isolating changed words or sentences between two documents.

SCC engine—It is a search engine that does Search, Compare, and Contrast multiple documents. It is a proprietary search engine from Aplix Research Inc.

Stakeholder—An individual, organization, or an operational unit that uses or shares the responsibility in the success of the project.

Trace (of a requirement statement)—A trace of a requirement is a sequence of documents where each document has description(s) of that requirement statement according to the nature of that document. Note: each row in FIG. 19 is an example of a Trace of a requirement statement.

User—A user can be an ordinary user who can browse the ivvSYSTEM and view the system. A user can be a privileged user who can view and change protected information on the system. A privileged user must go through the authentication and authorization process.

I claim:

1. An IV&V project management system comprising at least a networked database and at least one subsystem:
   (a) said networked database further comprising:
      (1) a first database comprising project related data, report, predefined consistency rules, predefined security rules and;
      (2) a second database containing at least one document required by the project; and
      (3) a third database comprising user credentials, predefined security rules and other project related information; and
   (b) said subsystem to execute desired function(s) in an IV&V project server computer comprising the following:
      (1) a module automatically providing a of project view based on documents in the databases, said module comprising:
         (i) a web based, color coded multi dimensional matrix where each row represents a project requirement item, each column represents a specific stage in the life cycle of a project requirement item and each entry is a link to a specific piece of information in a related document for the project progress to meet its milestones in the schedule;
         (ii) said module generates requirement traceability of the project in the form of multi staged links in a color coded multi dimensional matrix;
         (iii) said module accepts user requests to display the project view or to edit project item in the said multi dimensional matrix;
         (iv) said module incorporates color codes to automatically change the color of project items based on project status and information from the databases allowing user to visually understand the project growth; and
         (v) said module monitors project status and updates the project view
      (2) a module using a search, compare, and contrast engine to verify and validate the traceability of project requirements;
      (3) a module automatically monitoring and the security of the project server computer;
      (4) a module providing interface between user and the project server computer based on user privileges, said module communicates with the user, said module provides user help facility;
      (5) a module providing editing capability, sorting functions for project items and a printing facility;
      (6) said module searches information hierarchically based on words, phrases and sentences to pin-point relevant information in multiple documents and display the search result side-by-side;
      (7) said module compares documents using side-by-side cross referencing of multiple documents to support the electronic review of project documents using web forms;
      (8) said module contrasts multiple documents for any changes in words, phrases, sentences and paragraphs and display the result side-by-side for comparison to support version control of project documents, said module archives official version of project documents in the database; and
      (9) said module archives the results in databases to support project management including requirement traceability between multiple documents.

2. The subsystem according to claim 1, wherein said module in (b) (3) is further configured to perform following functions:
   (1) monitor the confidentiality and integrity of project documents;
   (2) monitor the current state of the computer operating system against a set of predefined rules to determine the health state of the project server computer;
   (3) monitor the operational integrity for anomalies against the project server computer;
   (4) perform intrusion detection for any malicious acts to the project server computer, wherein sending alerts automatically to the server administrator or responsible personnel in case there is any malicious act of some kind;
   (5) perform user authentication and user authorization based on user credential to ensure the security of the system.

3. The subsystem according to claim 1, wherein said module in (b) (4) is further configured to:
   (1) provide user interface to log in to the project server computer;
   (2) communicate with the user on matters related to the project, including the status of a project requirement, project problems and warning messages to the user via electronic mail, text message, audio message and video means via the communication medium, wherein user can be privileged user; and
   (3) provide user help and explanation of functions in the project view screen for user, said module sending a follow up message to help the user.

4. The subsystem according to claim 1, wherein said module in (b) (5) is further configured to:
   (1) provide a project view directed to handle the editing of project item or change project status to be reflected in the project view;
   (2) provide sort functions by displaying data in rows and/or columns sortable by time stamps, name or numeric order; and
   (3) provide print capability for the user and to store the printed data to an alternate location and/or alternate storage media according to user's choice.

5. A method of using computer implemented IV&V project management system comprising the following steps:
- (a) a first step of reading and storing project related data, information and documents to networked databases, said databases comprises
  - (1) a first database containing project related data, report, predefined consistency rules, predefined security rules and related information;
  - (2) a second database which contains all the documents that are mandatory required by the project;
  - (3) a third database containing related information related to the user of the project server computer; and
- (b) a second step of using a computer system to perform project management of an IV&V functions comprising the following components and processes:
  - (1) a search facility component to facilitate search compare and contrast of project documents, said facility allows the project server computer to generate the project view and to provide necessary reference of monitoring the status of the project allows users to find necessary information related to the project and makes a decision for matters related to the project;
  - (2) a web server components supports the web application, user interface for accepting requests and authenticating the user, generation of project view, wherein the web server and application protocols comprise http and different computer programming languages, wherein said web server component provides sorting different project items to visualize the status and manage the project, wherein said web server provides online and offline help to the user, explaining each item in the project, step by step from one project view to the next project view helping the user online and off-line by sending follow up notifications to the end user;
  - (3) an email server component to support the notification of project matter to the end user, said email server supports all system initiate notification to the end user via email, text messages and other electronic message means;
  - (4) a scheduler component from the base computer operating system to support the automatic activation of said perpetual processes on the said project server computer;
  - (5) a file system component to support the security of the system, said file system supporting the hierarchical electronic library of the project documents and all other project related rules, data and information;
  - (6) a component which automatically monitors the security state of the project server computer, said component examining the document database for integrity of the project documents examining project database based on a set of predefined rules for its consistence comparing the current state of the computer operating system against a set of predefined rules to determine the health state of the project server computer and reporting to the server administrator in case of any inconsistence detected or any malicious act of some kind; and
  - (7) a component to control the communication protocols comprising at least the TCP/IP protocol to support the application environment, said component controls the communication medium to connect the project server computer and the end user, said component interfacing with the user computing devices from the end user which access the project server computer via the communication medium to view the status of the project;

wherein the said method further comprises at least three perpetual processes to perform the IV&V project management functions:
- (i) a first perpetual process that performs the following:
  - (1) monitors the state of the project server computer and records the reports in the project database, said process automatically update the project view;
  - (2) said process is further configured to be perpetual in action automatically and periodically examining the status of the project using data recorded in the project database against a set of predefined rules to determine a particular project status and optionally to be activated periodically by a scheduler from the base operating system;
  - (3) said perpetual process incorporates color codes and automatically change the color code of project item based on information from the project databases;
  - (4) said process is further configured to be perpetual in action of updating color codes which periodically exams the status of the project, uses data recorded in the project database against a set of predefined rules to determine if a particular project item is in a condition that meets the rule and optionally to activate a color code to indicate the status of particular project items;
  - (5) said perpetual process alerts the user on matters related to the project;
  - (6) said perpetual process examines automatically and periodically data and/or information from the first, the second and/or the third databases; and
  - (7) Upon detection of late delivery of project item which affects at least one project milestone the said process alerts stakeholders according to scheduled policy against a list of names and addresses;
- (ii) a second perpetual process helping the user on-line and off-line, wherein the said process remembers what the user had asked and will follow up with the user via email or other electronic means using the communication medium when the information is available and periodically scanning the project database to determine if a follow up action needs to be executed; and
- (iii) a third perpetual process comprising the following functions:
  - (1) periodically and perpetually monitoring the confidentiality and integrity of project documents;
  - (2) periodically and perpetually comparing the current state of computer operating system against a set of predefined rules;
  - (3) periodically and perpetually comparing the operational integrity of the project server computer for deviations against anomalies;
  - (4) periodically and perpetually performs intrusion detection for malicious attacks to the project server computer; and
  - (5) periodically and perpetually alert the server administrator or responsible personnel in case there is any malicious act of some kind.

* * * * *